United States Patent [19]

Young

[11] Patent Number: 4,601,438
[45] Date of Patent: Jul. 22, 1986

[54] BAIT CASTING REEL WITH BRAKING DEVICE

[75] Inventor: John N. Young, Fairfax, Calif.

[73] Assignee: Charles C. Worth Corporation, Kentfield, Calif.

[21] Appl. No.: 728,097

[22] Filed: Apr. 29, 1985

[51] Int. Cl.[4] .............................................. A01K 89/02
[52] U.S. Cl. ................. 242/84.52 C; 310/93; 310/105; 188/267
[58] Field of Search .................. 242/84.52 B, 84.52 C, 242/155 M; 310/105, 93, 267; 188/185; 254/267

[56] References Cited

U.S. PATENT DOCUMENTS

| 1,566,594 | 12/1925 | Graham | 242/84.52 C |
| 3,986,678 | 10/1976 | Coquelet et al. | 242/84.52 C |
| 4,535,954 | 8/1985 | Worth et al. | 242/84.52 B |

FOREIGN PATENT DOCUMENTS 58-55477  4/1983  Japan .............................. 242/84.52 B Primary Examiner—Billy S. Taylor
Attorney, Agent, or Firm—Melvin R. Stidham

[57] ABSTRACT

A braking system for a rotating spool casting reel comprising a pair of diametrically opposed weights that are driven outward by centrifugal force, opposed by tension springs. At the beginning of the cast, the weights are driven outward into cooperation with an outer braking medium to produce an initial drag. As rotation decelerates, the drag decreases until the springs bring the blocks into engagement with an inner cylindrical surface that produces a substantial frictional drag to bring the spool to a stop to minimize the chance of overrun. Either the weights or adjacent reel housing is provided with magnet means and the other is made with electrically conductive material to augment the braking action.

4 Claims, 4 Drawing Figures

4,601,438

BAIT CASTING REEL WITH BRAKING DEVICE

BACKGROUND OF THE INVENTION

In a bait casting reel wherein the spool is rotated by tension on the line while casting, it is desirable to have just enough drag on the spool to keep the line under tension. During most of the time the spool is unwinding, it is desirable to keep this drag at a minimum level in order to achieve a maximum casting range. However, when the cast is completed, it is of advantage to increase the drag sharply in order to prevent spool overrun, which tends to produce a severe line tangle or "bird's nest". Hence, there is a brief period at the beginning of the cast when an increased drag is desired in order to achieve line tension and a second period at the end of the cast when an even greater drag is required in order to prevent spool overrun. Between those periods, minimum drag is desired in order to achieve greater casting range.

OBJECTS OF THE INVENTION

It is an object of this invention to provide a bait casting reel with a brake that enables both maximum casting distance and minimum spool overrun.

It is a further object of this invention to provide a bait casting reel with a system that provides different braking strength at different times in the casting cycle.

It is a further object of this invention to provide a bait casting reel that provides minimum braking action during most of the casting stroke and then maximum braking action as the cast is completed.

Other objects and advantages of this invention will become apparent from the description to follow, particularly when read in conjunction with the accompanying drawings.

SUMMARY OF THE INVENTION

In carrying out this invention, a disc is provided to rotate with the drum, and, carried on the disc is a pair of weights or drag blocks to move radially thereon. The weights are biased inward by tension springs but are thrown outward by centrifugal force as the spool rotates during casting. Braking means, provided around the disc cooperate with the drag blocks to produce an increased drag as the disc rotates at a relatively high velocity during the early part of the cast. As the disc slows, the drag is reduced substantially until the springs urge the drag blocks radially inward far enough to slide around an inner cylindrical surface, whereby frictional engagement produces a substantial braking action at the end of the cast, minimizing spool overrun.

DESCRIPTION OF PREFERRED EMBODIMENTS

Figure 1:
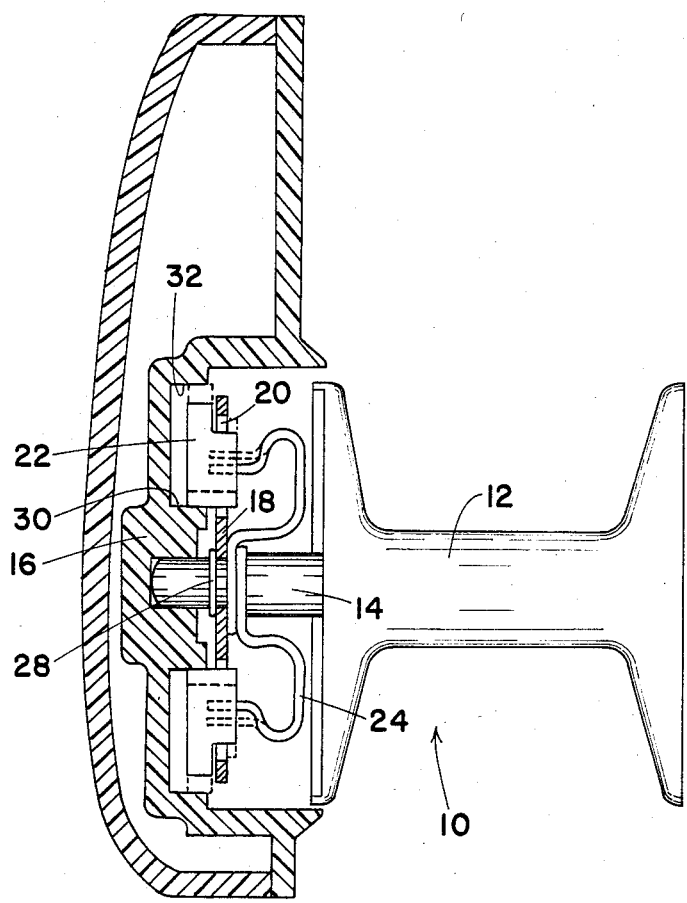
FIG. 1 is a vertical section view of a bait casting reel embodying features of this invention.
Figure 2:
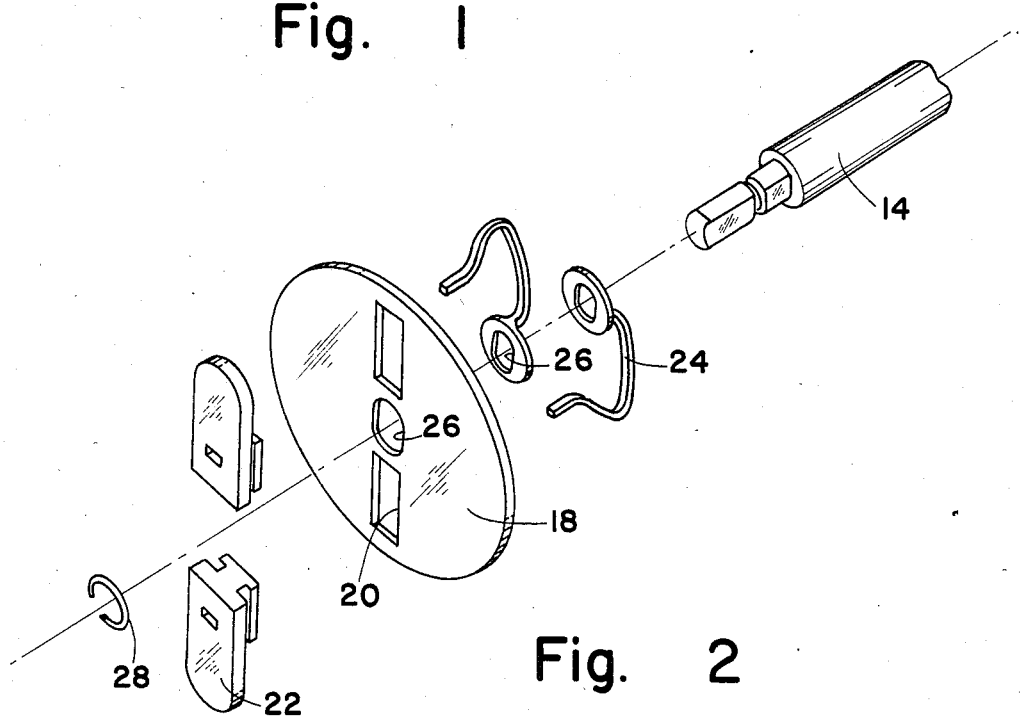
FIG. 2 is an exploded view in perspective showing the components of the braking system of FIG. 1.

The Embodiment of FIG. 1

Referring now to FIG. 1 with greater particularity the bait casting reel 10 of this invention includes a spool 12 carried on a support shaft 14, the support shaft being rotatably carried in the reel inner body 16.

Fixed on the support shaft 14 to rotate therewith is a drag block carrier disc 18 having diametrically opposed radial slots 20 in which are slidably carried the drag blocks 22, the drag blocks being urged to their innermost position by means of tension springs 24. The support disc 20 and springs 24 are slidably but nonrotatably carried on the support shaft by complementary flat surfaces 26 and are held in place by means of a suitable retainer clip 28.

In the embodiment of FIG. 1, the weights or drag blocks 22 are biased by the springs 24 toward the inner cylindrical surface 30 on the inner body 16 and, when thrown outward by centrifugal force engage the surrounding outer cylindrical surface 32.

In operation, at the beginning of the cast, the springs 24 are quickly overcome by centrifugal force and the weights 22 are thrown outward to produce an increased drag on the outer cylindrical surface 32 of the inner body 16. Then, the springs 24 commence to pull the weights 22 radially inward so that the spool 12 rotates with relatively little drag for maximum casting range. Finally, at the end of the cast, the springs 24 overcome centrifugal force so that the blocks 22 produce a substantial drag as they ride against and around the first cylindrical surface 30, to retard the rotation of the spool and bring it to a stop with minimum opportunity for overrun.

Figure 3:
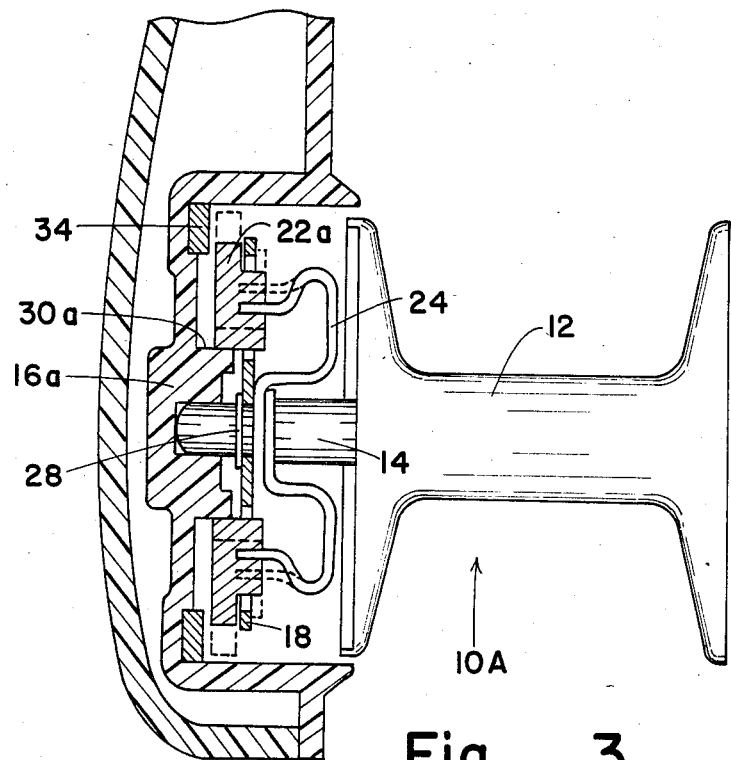
FIG. 3 is a section view of another embodiment of this invention.

The Embodiment of FIG. 3

In this embodiment 10A, the weights or drag blocks 22a are made of a electrically conductive material, and mounted on the inner reel body 16a, is an annular magnet 34 that tends to produce random electrical currents in the weights 22a, as they move outward and extend further into the magnetic field. Again, with little or no rotation, the drag blocks 22a are pressed against the inner cylindrical surface 30a by the tension of the springs so that at low velocity, there is a substantial frictional drag on the disc 18 and, hence, the spool 12. Then, as the cast begins, the weights 22a are thrown outward into the strong magnetic field of the annular magnet 34 against the force of the springs 24, producing an increased, though not maximum, drag. The braking action reduces progressively as the springs 24 tend to pull the weights 22a inward, as the spool begins to decelerate its rotation. Finally, when the disc 18 slows enough, the springs 24 urge the weights 22a into firm frictional engagement with the inner cylindrical surface 30a to produce a braking action, as in the embodiment of FIG. 1.

Figure 4:
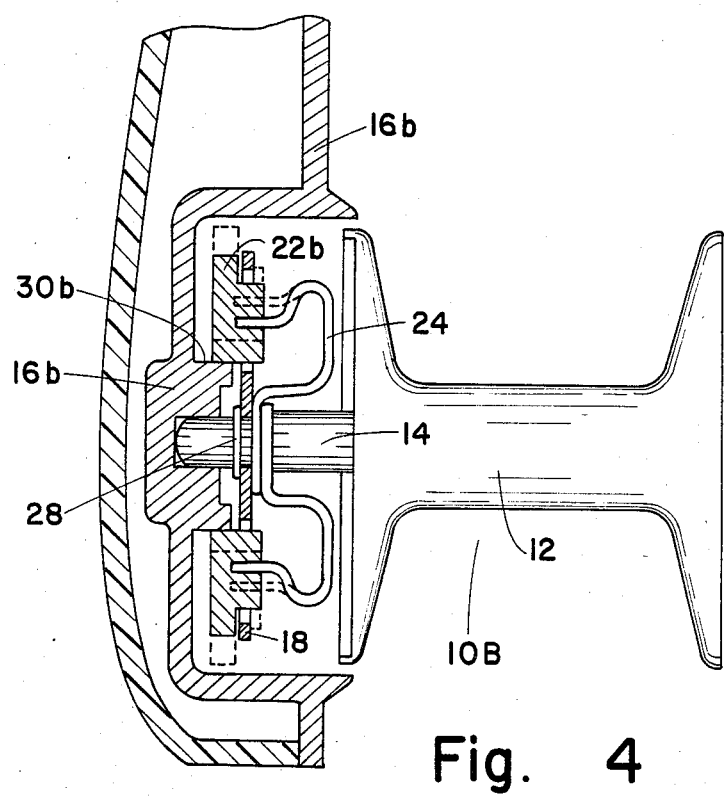
FIG. 4 is a section view of still another embodiment of this invention.

The Embodiment of FIG. 4

In this embodiment, the drag weights 22b themselves are formed as magnets and the inner body 16b is of an electrical conductive material. At extrememly low rotation, when centrifugal force is overcome by the springs 24, there is substantial friction between the magnetized weights 22b and the material of the inner body 16b. Then, as the cast begins, the weights 22b are thrown outward, creating a strong electrical interaction between the inner body 16b and the weights 22b, which causes a magnetic drag which produces a braking action on the support disc 18 and spool 12.

As the magnetic brake slows the spool, the tension springs 24 pull the drag blocks 22b toward the inner cylindrical surface 30b so that, as fewer magnetic lines of force are interrupted, the magnetic drag reduces progressively. Finally, as the spool decelerates further, the tension springs pull the drag blocks 22b into contact with inner cylindrical surface 30b so that there is a combined frictional and magnetic drag that brings the spool 12 to a stop with a minimum amount of overrun.

While this invention has been described in conjunction with preferred embodiments thereof, it is obvious that modifications and changes therein may be made by those skilled in the art to which it pertains without departing from the spirit and scope of this invention, as defined by the claims appended hereto.

What is claimed as invention is:

1. In a rotating spool casting reel including:
a body;
a shaft rotatable in said body; and
a spool fixed on said shaft to rotate therewith;
the improvement comprising:
a carrier fixed on said shaft to rotate therewith;
at least one block radially movable on said carrier;
an inner, cylindrical brake surface slidably engagable by each said block;
spring means biasing each said block radially inward toward said inner brake surface;
said spring means being opposed by centrifugal force when said shaft and carrier are rotating; and
interacting braking media on each of said blocks and on said body operative to apply an increased retardation force to movement of said blocks when said carrier is rotated;
one of said media comprising a magnet and the other of said media comprising an electrically conductive material.

2. The combination defined by claim 1 wherein:
said blocks are of an electrically conductive material; and
said outer braking medium in an annular magnet fixed to said body and disposed coaxial with, and outward of, said inner brake surface.

3. The combination defined by claim 1 wherein:
said blocks are magnets; and
said body is of an electrically conductive material;
a wall of said body extending generally radially of said shaft so that magnetic force increases as said blocks move radially outward.

4. The combination defined by claim 1 wherein:
said carrier is a disc;
means forming a pair of aligned radial slots in said disc;
there being a block slidable in each of said radial slots.

* * * * *